(12) United States Patent
Watson et al.

(10) Patent No.: US 10,740,298 B2
(45) Date of Patent: Aug. 11, 2020

(54) FILE SYNCHRONIZATION WITH REDUCED CONFLICTS IN COMPUTING SYSTEMS

(71) Applicant: Microsoft Technology Licensing, LLC, Redmond, WA (US)

(72) Inventors: Andrew Sean Watson, Seattle, WA (US); Steve Rayson, Redmond, WA (US); Yigithan Dedeoglu, Kirkland, WA (US); George Armah, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 15/405,553

(22) Filed: Jan. 13, 2017

(65) Prior Publication Data

US 2018/0101544 A1 Apr. 12, 2018

Related U.S. Application Data

(60) Provisional application No. 62/407,166, filed on Oct. 12, 2016.

(51) Int. Cl.
*G06F 16/00* (2019.01)
*G06F 16/178* (2019.01)
*H04L 29/08* (2006.01)

(52) U.S. Cl.
CPC ........ *G06F 16/178* (2019.01); *H04L 67/1095* (2013.01)

(58) Field of Classification Search
CPC combination set(s) only.
See application file for complete search history.

(56) References Cited

U.S. PATENT DOCUMENTS

| 6,151,708 | A | 11/2000 | Pedrizetti et al. |
| 8,082,316 | B2 | 12/2011 | Rakowski et al. |
| 8,806,656 | B2 | 8/2014 | Roy et al. |
| 8,862,561 | B1 | 10/2014 | Nesbit et al. |
| 9,268,655 | B2 | 2/2016 | Chan et al. |

(Continued)

FOREIGN PATENT DOCUMENTS

CN 103248711 A 8/2013

OTHER PUBLICATIONS

"Hashes and ETags: Best Practices", Retrieved on: Dec. 28, 2014 Available at: https://cloud.google.com/storage/docs/hashes-etags.

(Continued)

*Primary Examiner* — Farhan M Syed
(74) *Attorney, Agent, or Firm* — Liang IP, PLLC

(57) ABSTRACT

Techniques for limiting synchronization conflicts during file synchronization in a computing system are described herein. In one embodiment, a method includes detecting a change to a local copy a computer file on a client device. The local copy is associated with a local token. The method also includes obtaining a server token associated with a server copy of the same computer file on a file server and determining whether the local token matches the server token. If the local and server tokens match each other, the method includes uploading the local copy to the file server to overwrite the server copy even though the server copy contains a change to the computer file that is different than a change to the local copy of the same computer file.

18 Claims, 12 Drawing Sheets

(56) References Cited

U.S. PATENT DOCUMENTS

| | | | |
|---|---|---|---|
| 9,588,849 B2* | 3/2017 | Sinha | G06F 16/00 |
| 9,928,005 B2* | 3/2018 | Sinha | G06F 16/00 |
| 2005/0210079 A1* | 9/2005 | Edlund | G06F 16/178 |
| 2007/0283011 A1 | 12/2007 | Rakowski et al. | |
| 2008/0140732 A1 | 6/2008 | Wilson et al. | |
| 2009/0228509 A1 | 9/2009 | McCarthy et al. | |
| 2012/0233293 A1 | 9/2012 | Barton et al. | |
| 2013/0006947 A1* | 1/2013 | Akinyemi | G06F 16/178 |
| | | | 707/687 |
| 2013/0103651 A1 | 4/2013 | Jha et al. | |
| 2014/0006352 A1 | 1/2014 | Sachs et al. | |
| 2015/0186668 A1 | 7/2015 | Whaley et al. | |
| 2016/0098469 A1* | 4/2016 | Allinson | G06F 16/27 |
| | | | 707/610 |
| 2016/0210202 A1* | 7/2016 | Sinha | G06F 16/00 |
| 2017/0131912 A1* | 5/2017 | Sinha | G06F 16/00 |

OTHER PUBLICATIONS

Feldman, et al., "SPORC: Group Collaboration using Untrusted Cloud Resources", In Proceedings of the 9th USENIX conference on Operating systems design and implementation, Oct. 4, 2010, 14 pages.

Fielding, et al., "Hypertext Transfer Protocol—HTTP/1.1", Published on: Jun. 1999 Available at: https://www.ietf.org/rfc/rfc2616.txt.

"International Search Report and Written Opinion Issued in PCT Application No. PCT/US2017/055452", dated Dec. 6, 2017, 11 Pages.

* cited by examiner

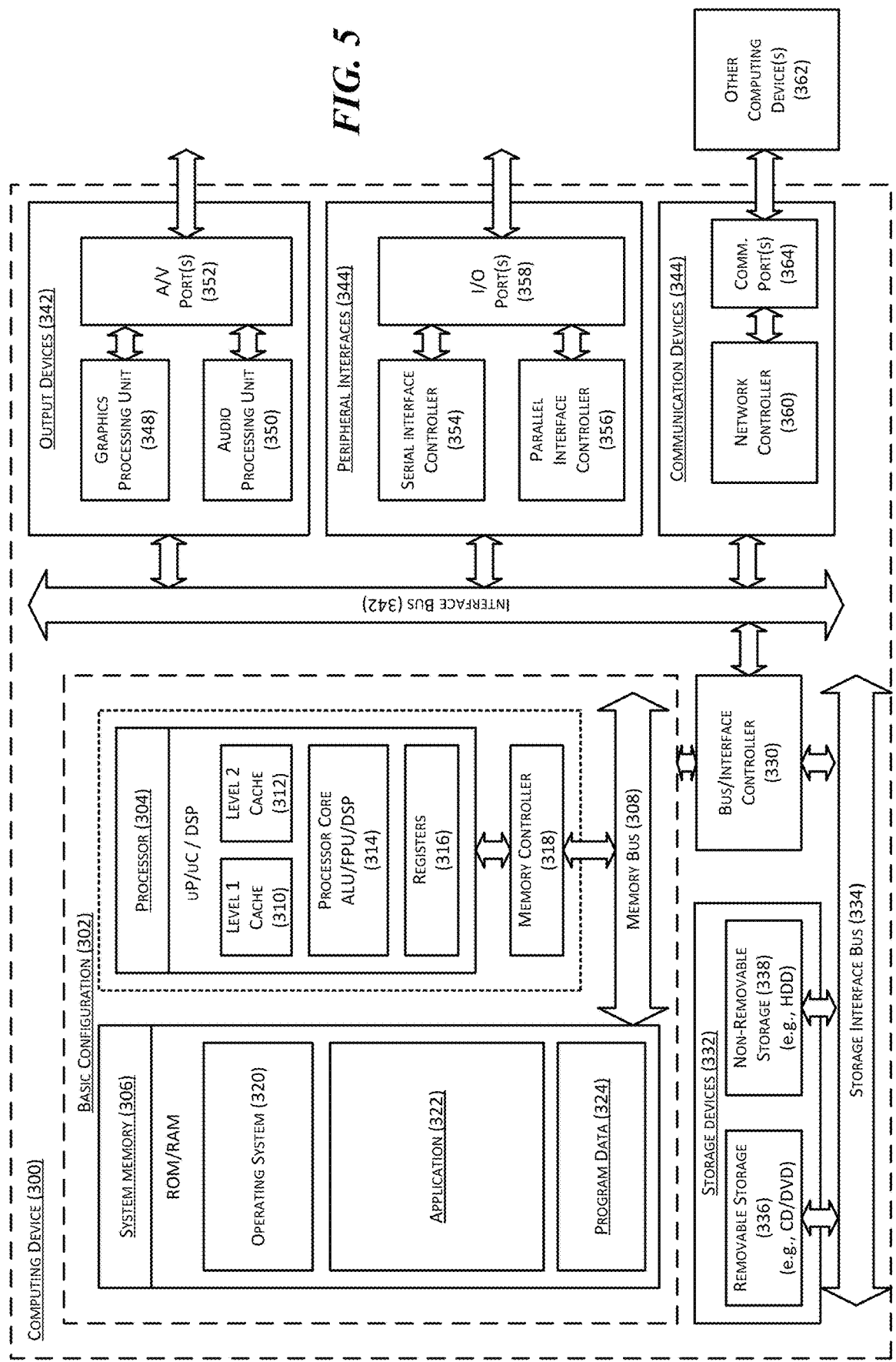

FILE SYNCHRONIZATION WITH REDUCED CONFLICTS IN COMPUTING SYSTEMS

CROSS-REFERENCE TO RELATED APPLICATION(S)

This application is a non-provisional application of and claims priority to U.S. Provisional Application No. 62/407,166, filed on Oct. 12, 2016.

BACKGROUND

In computing, file servers are computers configured to provide shared storage of documents, sound files, photographs, movies, images, databases, or other suitable types of computer files over computer networks. File servers can facilitate multiple client devices to access the same computer files stored in an on-premises or remote repository. Users utilizing suitable client devices can retrieve, edit, save, or perform other suitable file operations on computer files while file servers track versions of the computer files, last edited date/time, users who edited and/or accessed the computer files, and/or other suitable information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

File synchronization is a process of ensuring that computer files in two or more file locations are updated according to certain rules. In one-way file synchronization, updated files are copied from a source location (e.g., a hard drive) to one or more target locations (e.g., a cloud storage location). However, no files are copied back from the target locations to the source location. In two-way file synchronization, updated files are copied in both directions, usually with the purpose of maintaining identical copies at the all locations. In the description herein, the term "file synchronization" refers to two-way file synchronization.

One challenge of file synchronization is to limit occurrences of synchronization conflicts. A synchronization conflict exists when two copies of a single computer file contain different changes based on the same or different versions of the computer file. For example, a user can upload a computer file from a client device to a file server. In turn, the file server can store a server copy of the uploaded computer file on the file server or in a suitable storage location. During creation and/or file maintenance, the file server or other servers can insert various metadata (e.g., time of creation, uploaded by, priority, etc.) into the server copy based on certain metadata schema. Thus, the server copy can become "updated" and byte-wise different than a local copy of the computer file on the client device. If the user edits the local copy of the computer file without downloading the "updated" server copy, the edited local copy would contain changes different than those (i.e., the inserted metadata) in the server copy. Thus, a synchronization conflict would be triggered during file synchronization between the local and server copies of the computer file. Resolving such conflicts can be time consuming, costly, and can negatively impact user experience.

Several embodiments of the disclosed technology can limit occurrences of synchronization conflicts by implementing both a read validation token and a write validation token associated with copies of computer files. The read validation token can be updated when a copy of a computer file is modified in any way to be byte-wise different than an original copy. As such, when metadata is inserted into a server copy with an original read validation token, the "updated" server copy can be associated with a new read validation token. The write validation token is updated only when a copy of a computer file contains changes that are to be preserved. Such changes can include, for example, user edits or other changes a user performs on a computer file. When a copy of a computer file does not include preserved changes but instead those (e.g., machine modifications) that are re-appliable, the write validation token is maintained even when the copy is byte-wise modified. For example, metadata insertions can be machine modifications that are re-appliable and thus do not cause a write validation token to be updated.

In certain implementations, a file server can assign a read validation token and a write validation token to an uploaded computer file and notify the client device regarding the assigned read/write validation tokens. In other implementations, at least one of the read or write validation token can be generated and/or predicted based on a protocol followed by both a file server and client devices. For example, in one embodiment, the read or write validation token can include a hash (e.g., an XOR hash) of the computer file. In other embodiments, the read or write validation token can be generated utilizing discrete numbers, random numbers, or in other suitable fashions.

According to certain aspects of the disclosed technology, if a local copy is not modified and has a read validation token that is different than that of a server copy of the same computer file, the client device can determine that the server copy has been updated and download the server copy to overwrite the local copy. For example, during creation of the server copy and/or file maintenance, insertion of metadata can cause the server copy to have a read validation token different than that of the local copy because the server copy with the inserted metadata is byte-wise different than the local copy. As such, once the client device detects such a difference during file synchronization, the client device can download the server copy to overwrite the local copy on the client device, and thus achieving overall synchronization of the computer file.

According to additional aspects of the disclosed technology, if the local copy is modified on the client device but has a write validation token that is the same as that of the server copy, the client device can upload the modified local copy to overwrite the server copy even when a read validation token of the local copy is different than that of the server copy. For instance, during creation and/or file maintenance, insertion of the metadata into the server copy can cause the server copy to have an updated read validation token different than that of the local copy. However, the inserted metadata can be indicated as re-appliable machine modifications (e.g., by a workflow server) and thus does not cause the write validation token associated with the server copy to change. When the user edits the local copy on the client device, the edited local copy and the server copy can still have the same write validation token. As such, the client device can upload the edited local copy as a new server copy to overwrite the existing server copy with the previously inserted metadata. Subsequently, the metadata can be reapplied to the new server copy, and the client device can download the new server copy with the inserted metadata based on a difference of read validation token between the new server copy and the local copy to achieve synchronization of the computer file, as described above.

Several embodiments of the disclosed technology can limit occurrences of synchronization conflicts due to re-appliable machine modifications to computer files by file servers, workflow servers, or other suitable computing devices. Instead of indicating a synchronization conflict exists between a user-edited local copy and a server copy with machine modifications, several embodiments of the disclosed technology allow the server copy be overwritten by the user-edited local copy along with the machine modifications. The same or similar machine modifications can later be re-applied to the overwritten server copy. The client device can then download the overwritten server copy with the re-applied machine modifications when no more user edits exist in the local copy to achieve overall synchronization of the computer file.

BRIEF DESCRIPTION OF THE DRAWINGS

FIG. 5 is a computing device suitable for certain components of the computing system in FIG. 1.

DETAILED DESCRIPTION

Figure 1:
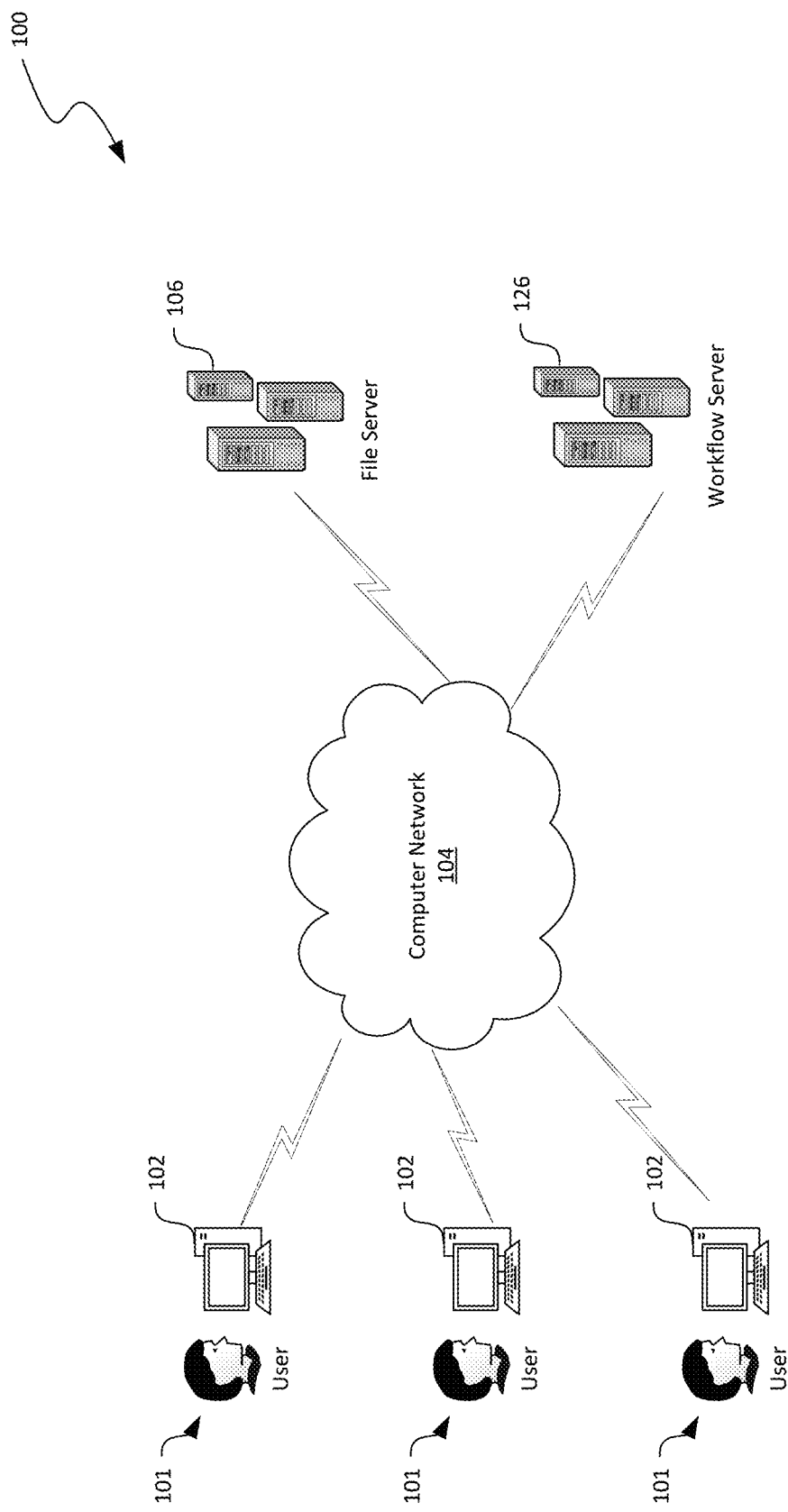
FIG. 1 is a schematic diagram of a computer system implementing both read and write validation tokens in accordance with embodiments of the disclosed technology.

Certain embodiments of computing systems, devices, components, modules, routines, and processes for limiting synchronization conflicts during file synchronization are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-5.

As used herein, the term "file synchronization" generally refers to a process of ensuring that copies of computer files in two or more file locations are updated in both directions according to certain rules. In one example, a new or updated copy of a computer file can be copied (e.g., uploaded) from a client device to a file server via a computer network, a direct wired/wireless connection, or other suitable communications channels. In another example, an updated copy of the same computer file can be copied (e.g., downloaded) from the file server to the client device via a suitable communications channel. A "synchronization conflict" can occur when copies of the same computer file include different changes based on the same or different versions of the computer file.

In certain file sharing computer systems, file servers or other types of servers can insert, add, append, or otherwise modify a user-uploaded computer file. For example, a client device can include a copy of a computer file (referred to as "local copy") to be uploaded to a file server. Once received, the file server can store the received copy of the computer file (referred to "server copy") in a network storage location, a server hard drive, or other suitable storage locations. During creation and/or file maintenance of the server copy, various metadata (e.g., time of creation, uploaded by, priority, etc.) can be inserted into the server copy based on metadata schema of the file sharing system. As such, the server copy can become "updated," i.e., containing new digital data, then the local copy on the client device. If the local copy is edited on the client device without downloading the "updated" server copy, the edited local copy can contain changes different than those (i.e., the inserted metadata) in the "updated" server copy, and thus causing a synchronization conflict. Resolving such conflicts can be time consuming, costly, and can negatively impact user experience.

Several embodiments of the disclosed technology can limit occurrences of the foregoing synchronization conflicts by implementing a write validation token associated with individual copies of computer files in addition to a read validation token. The read validation token can be updated when a server copy of a computer file is modified in any way to be byte-wise different than an original server copy. As such, when metadata is inserted into a server copy, the server copy with the inserted metadata can have an updated read validation token. The write validation token, on the other hand, can be maintained when a server copy of a computer file is modified but the modification is indicated as re-appliable. For example, the insertion of metadata or other suitable types of machine modifications can be indicated as re-appliable and thus do not cause a write validation token to be updated. Instead of indicating a synchronization conflict exists between a user-edited local copy and a server copy with machine modifications, the disclosed technology allows the file server to overwrite the server copy with the machine modifications with the user-edited local copy. Thus, certain synchronization conflicts due to re-appliable machine modifications can be avoided, as described in more detail below with reference to FIGS. 1-5.

FIG. 1 is a schematic diagram illustrating a file sharing computer system 100 implementing both read and write validation tokens in accordance with embodiments of the disclosed technology. As shown in FIG. 1, the computer system 100 can include a file server 106 and a workflow server 126 interconnected with one or more client devices 102 via a computer network 104. The individual client devices 102 are associated with corresponding users 101. The computer network 104 can include an enterprise intranet, a wide area network, a local area network, the Internet, or other suitable types of network.

Even though particular components and associated arrangements of the computer system 100 are shown in FIG. 1, in other embodiments, the computer system 100 can include additional and/or different components. For example, in the illustrated embodiment, the computer system 100 includes three client devices 102 corresponding to different users 101. In other embodiments, the computer system 100 can also include multiple client devices 102 associated with a single user 101. In further embodiments, the computer system 100 can also include additional file servers, web servers, domain name servers, workflow servers, network storage facilities, or other suitable components.

The client devices 102 can each include a computing device that facilitates corresponding users 101 to access to the file server 106 via the computer network 104. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the computer system 100 can facilitate any suitable number of users 101 to access file server 106 via the computer network 104.

The file server 106 can be configured to provide shared storage of documents, sound files, photographs, movies, images, databases, or other suitable types of computer files to the client devices 102 over the computer network 104. For example, users 101 utilizing corresponding client devices 102 can retrieve, edit, save, or perform other suitable file operations on computer files managed by the file server 106. The file server 106, in turn can track versions of computer files, last edited date/time, users who edited and/or accessed the computer files, and/or other suitable information associated with the computer files. In certain embodiments, the file server 106 can include one or more servers having suitable software applications to provide file synchronization for users of an enterprise, company, corporations, government entities, or other suitable organizations. In other embodiments, the file server 106 can also include one or more remote servers providing cloud-based storage services such as, for example, Google Drive®, Dropbox®, iCloud Backup®, etc.

In accordance with certain aspects of the disclosed technology, the file server 106 can be configured to implement both a read validation token and a write validation token associated with copies of computer files on the file server 106 in order to limit occurrences of synchronization conflicts due to machine modifications. A read validation token can indicate to a client device 102 that a server copy of a computer file has been updated on the file server 106. A write validation token can indicate to a client device 102 that the server copy has not been updated with data (e.g., machine modifications) that cannot be re-applied. In certain implementations, a read/write validation token can include an XOR hash value of a copy of a computer file. In other implementations, a read/write validation token can include numerical values, alphanumerical values, other types of hash values, or other suitable types of values. Example components and operations of the file server 106 and one of the client devices 102 are described in more detail below with reference to FIGS. 2A-2D.

The workflow server 126 can be configured to apply machine modifications to copies of computer files managed by the file server 106. In certain embodiments, the workflow server 126 can include a server configured to facilitate processing and/or management of the computer files by, for example, supplementing metadata according to certain metadata schema. In other embodiments, the workflow server 126 can be configured to perform other suitable operations related to storage, retrieval, and/or maintenance of the computer files. Though the workflow server 126 is shown in FIG. 1 as a component of the computer system 100, in other embodiments, the workflow server 126 can be external to the computer network 100. In further embodiments, the workflow server 126 can be omitted and associated operations performed by the file server 106.

FIGS. 2A-2D are schematic diagrams illustrating certain hardware/software components of the computer system 100 in FIG. 1 during certain stages of a file synchronization process. In FIGS. 2A-2D, certain components of the computer system 100 are omitted for clarity. For example, only one client device 102 is shown in FIGS. 2A-2D for illustration purposes. Other client devices 102 can have similar components and associated operations, as those described in more detail below with reference to FIGS. 2A-2D.

In addition, in FIGS. 2A-2D and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 2A:
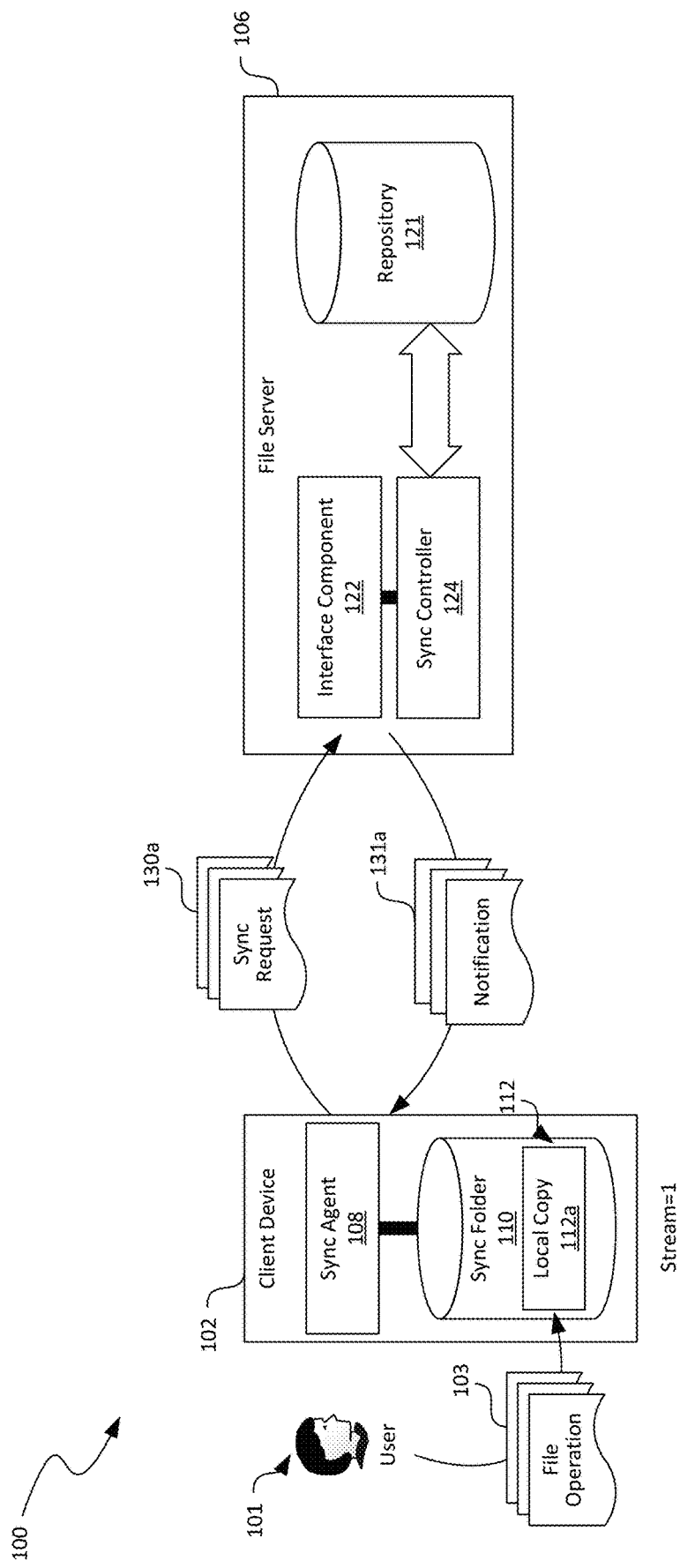
FIGS. 2A-2D are schematic diagrams illustrating certain hardware/software components of the computing system in FIG. 1 during certain stages of a file synchronization process.

Though not shown in FIG. 2A, the client device 102 and the file server 106 can both include a processor operatively coupled to a memory containing instructions executable by the processor to provide certain software components. For example, as shown in FIG. 2A, the client device 102 can include a sync agent 108 interconnected to a sync folder 110. The sync agent 108 can be configured to perform synchronization state verification, file synchronization, file maintenance, or other suitable operations related to synchronization of computer files between the client device 102 and the file server 106. The sync folder 110 can be a file folder on the client device 102 designated to contain copies of computer files to be synchronized with corresponding copies on the file server 106. In certain embodiments, the sync folder 110 can be designated by default, for example, as related to a cloud-based storage. In other embodiments, the sync folder 110 can be manually designed by the user 101, or designated in other suitable fashions.

The file server 120 can include an interface component 122 and a sync controller 124 operatively coupled to a repository 121 for storing computer files. The interface component 122 can be configured to interact with the sync agent 108 on the client device 102 according to certain protocols. In certain embodiments, the interface component 122 can include an application programming interface configured to receive certain input and in response provide certain output to the client device 102. In other embodiments, the interface component 122 can also include a computer network interface or other suitable components.

The sync controller 124 can be configured to manage synchronization of copies of computer files in the repository 121. In certain embodiments, the sync controller 124 can be configured to implement a read validation token associated with each copy of the computer files. In other embodiments, the sync controller 124 can also be configured to implement a write validation token associated with each copy of the computer files to reduce certain synchronization conflicts between copies of computer files on the client device 102 and the repository 121, as described in more detail below with reference to FIGS. 2A-3D. In the following description, for ease of reference, a copy of a computer file in the sync folder 110 on the client device 102 is referred to as a "local copy" while a copy of the same computer file in the repository 121 is referred to as a "server copy."

FIG. 2A illustrates a file synchronization stage in which the user 101 creates a local copy 112a of a computer file 112 in the sync folder 110 via a file operation 103. For example, in certain embodiments, the user 101 can drag and drop the computer file 112 from another file folder (not shown) on the client device 102 into the sync folder 110. In other embodiments, the computer file 112 can be a newly created computer file. As shown in FIG. 2A, the local copy 112a can include a stream of digital data referenced as by a stream number one for illustration purposes. In other embodiments, the stream of digital data can be referenced using hash values, random numbers, or in other suitable ways.

As shown in FIG. 2A, the sync agent 108 can detect the presence of the local copy 112a of the computer file 112 and determine that synchronization of the computer file 112 is needed based on, for example, metadata associated with the computer file 112 that indicates a lack of synchronization (e.g., having an empty last synchronized date/time) of the computer file 112. In response, the sync agent 108 can be configured to transmit, via the computer network 104 (FIG. 1), a sync request 130a to the file server 106. In certain embodiments, the sync request 130a can include data representing certain information associated with the computer file 112. Such information can include, for example, file name, date/time created, authored by, file size, or other suitable information.

The interface component 122 can receive the sync request 130a and provide the received sync request 130a to the sync controller 124 for further processing. Upon receiving the sync request 130a, the sync controller 124 can determine whether a corresponding server copy exists in the repository 121. In the illustrated embodiment of FIG. 2A, a corresponding server copy does not exist in the repository 121. As such, the file server 106 can provide a notification 131a informing the client device 102 that a server copy does not exist on the file server 106. In other embodiments, if a server copy (not shown) already exists in the repository 121, for example, having been uploaded by another user 101, the notification 131a can inform the client device 102 the existence of the server copy as well as associated read/write validation tokens associated with the server copy to the client device 102. The sync agent 108 can then determine whether to upload the local copy 112a or download the server copy as described in more detail below with reference to FIGS. 2B-2C.

Figure 2B:
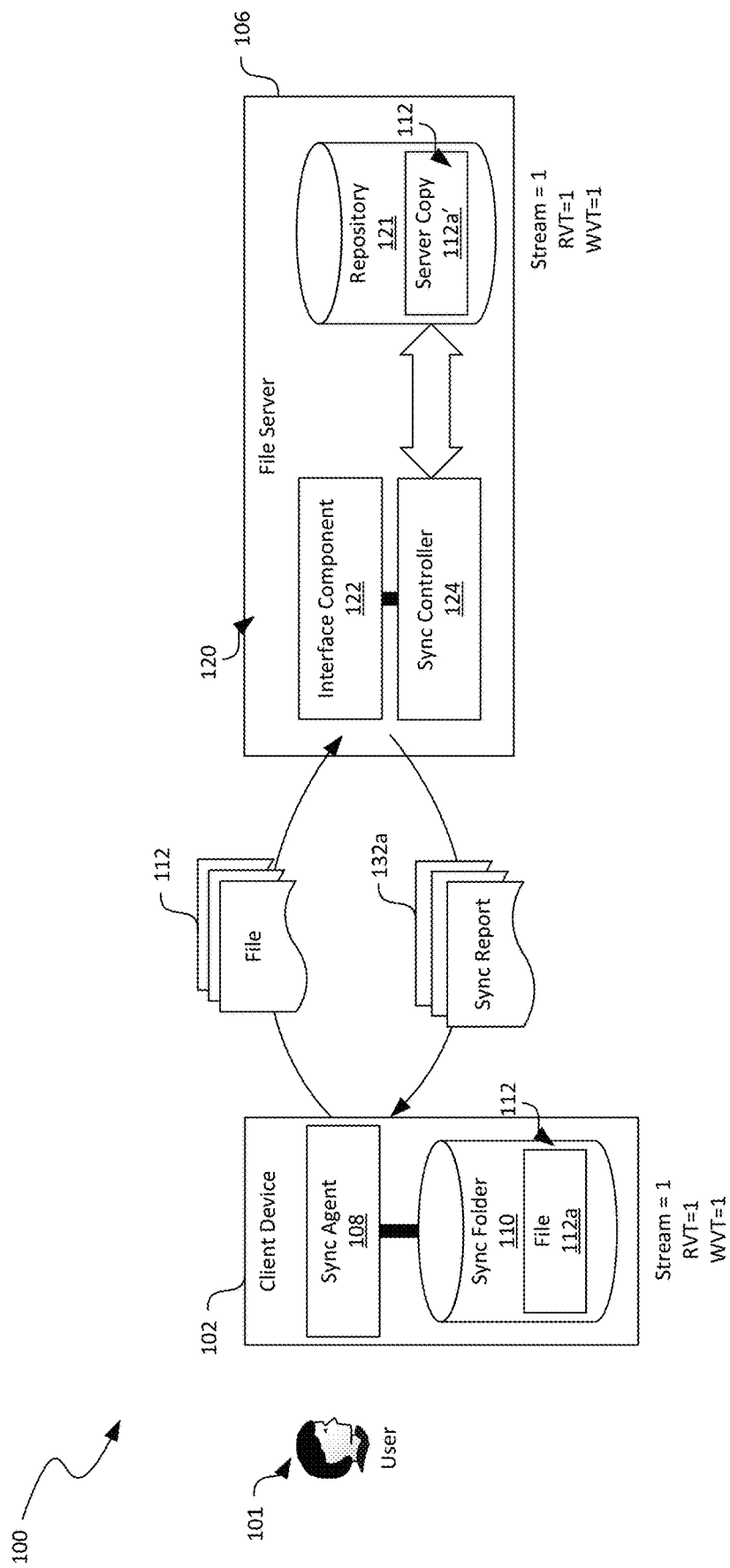

As shown in FIG. 2B, upon receiving the indication that a server copy of the computer file 112 does not exist in the repository 121, the client device 102 can upload the computer file 112 to the file server 106 via the computer network 104. Upon receiving the uploaded file 112, the sync controller 124 can store a server copy 112a' of the computer file 112 in the repository 121. The sync controller 124 can also be configured to associate the received computer file 112 and the server copy 112a' with a read validation token (shown as "RVT") and a write validation token (shown as "WVT"). In certain embodiments, the sync controller 124 can provide the read/write tokens to the client device 102 as part of a sync report 132a that indicates to the client device 102 that the upload has completed successfully and/or other suitable related information. In other embodiments, the client device 102 can predict the read/write validation tokens based on a protocol followed by both the client device 102 and the file server 106. As shown in FIG. 2B, the read/write validation tokens for both the local copy 112a and the server copy 112a' of the computer file 112 are both assigned a value of one for illustration purposes. In other embodiments, the read/write validation tokens can have different hash values, random numbers, or other suitable values.

Figure 2C:
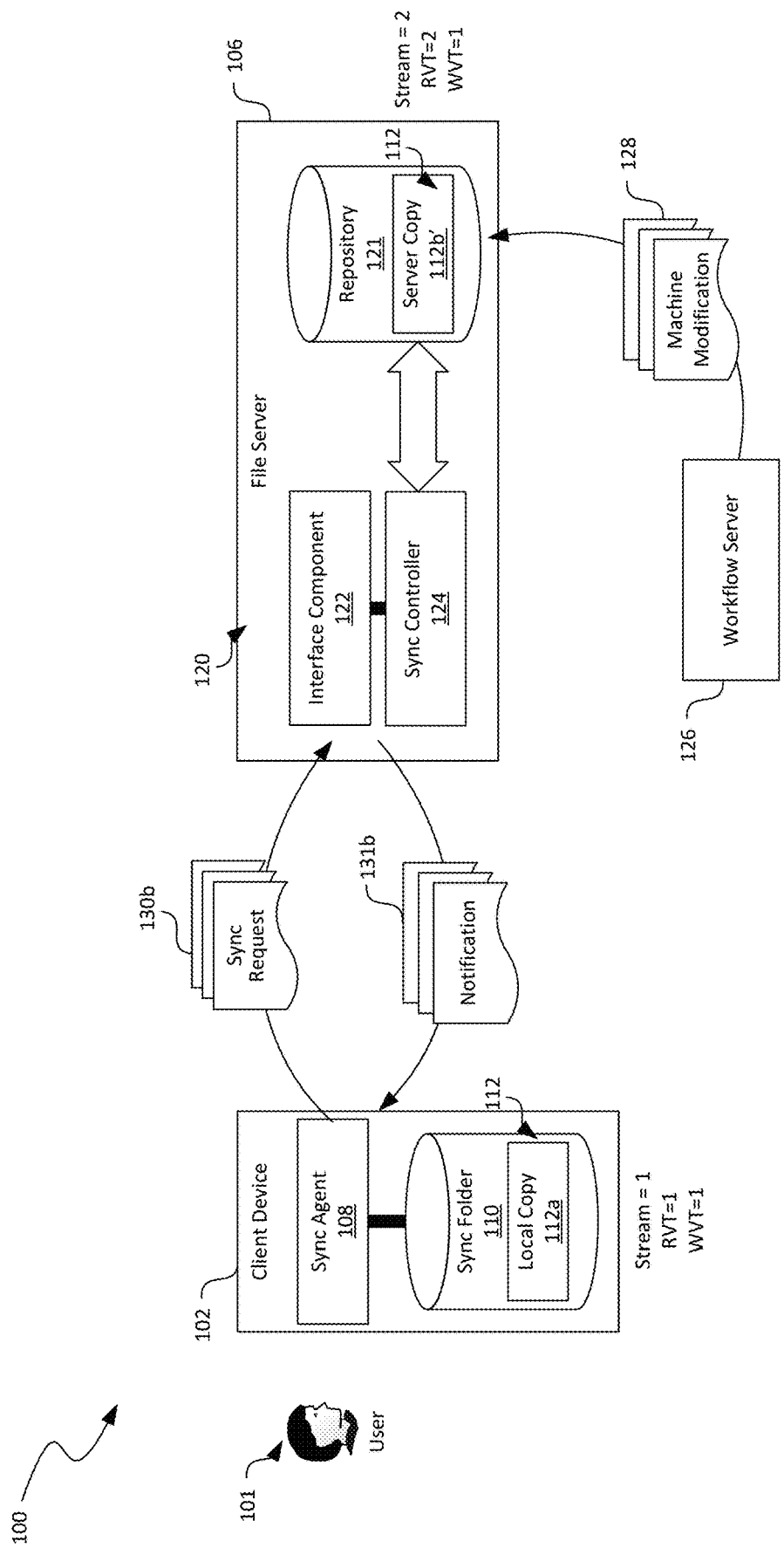

As shown in FIG. 2C, a workflow server 126 can be configured to apply machine modifications 128 to the server copy 112a' (FIG. 2B). In certain embodiments, the machine modifications 128 can include certain metadata supplemented to the server copy 112a' to generate an updated server copy 112b'. In other embodiments, the machine modifications 128 can include other suitable machine applied changes to the server copy 112a'. In further embodiments, administrative servers, database servers, or other suitable types of servers (not shown) can also apply machine modifications 128 to the server copy 112a'.

During application of the machine modifications 128, the sync controller 124 can detect the application and, in response, update the read validation token. For example, as shown in FIG. 2C, the server copy 112b' can now have a read validation token value of two and a stream value of two due to the machine modifications 128. The sync controller 124 can also be configured to receive, for example, from programs executing on the workflow server 126, whether the applied machine modifications 128 are re-appliable. In certain embodiments, machine modifications 128 are re-appliable when such machine modifications 128 can be periodically applied if previous application is not detected. In other embodiments, machine modifications 128 are re-appliable when such machine modifications are repeatedly applied irrespective of previous applications. Upon receiving an indication that the applied machine modifications 128 are re-appliable, or not to be preserved, the sync controller 124 can maintain the write validation token, for example, at one in FIG. 2C while updating the read validation token to two.

Figure 2D:
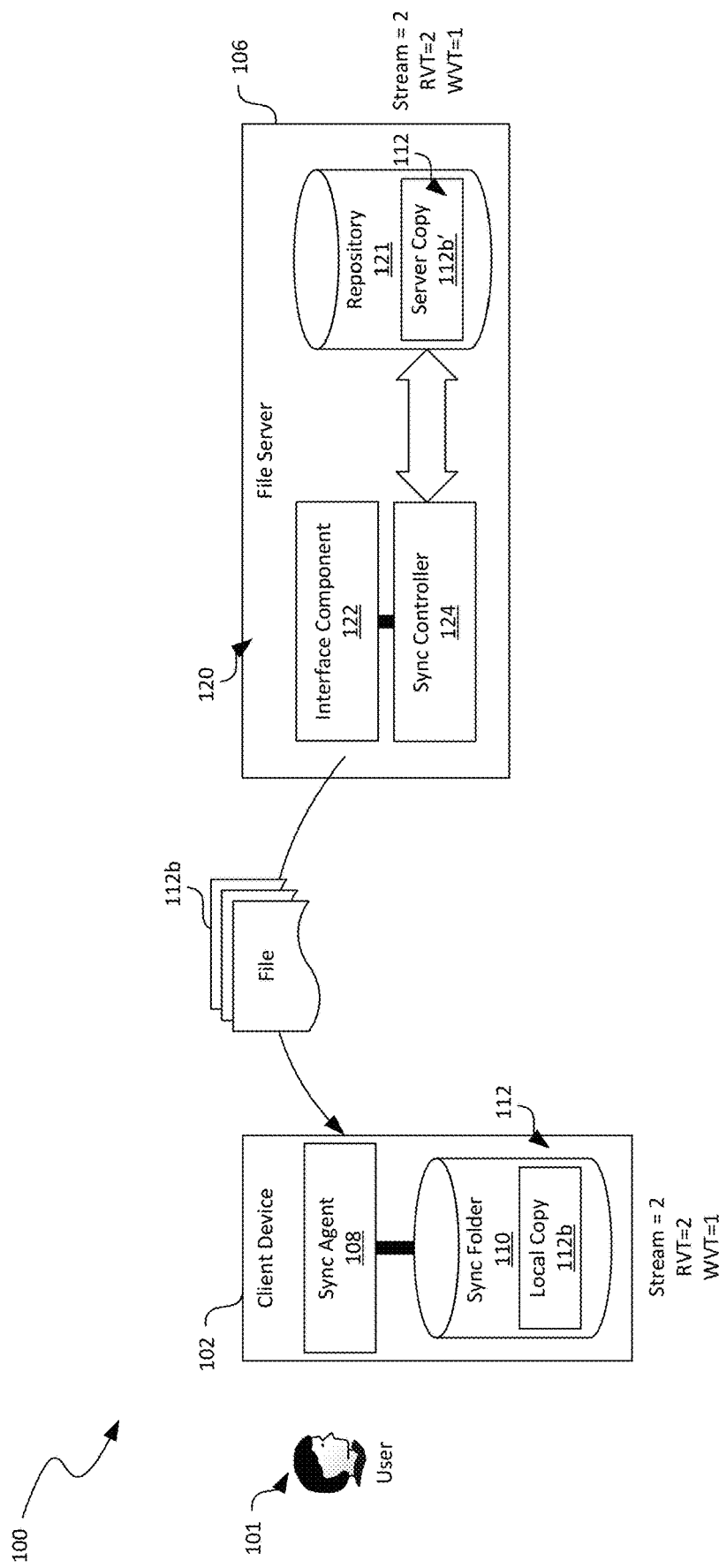

During a subsequent synchronization cycle, the client device 102 can transmit another sync request 130b and in response receive another notification 131b from the file server 106, indicating that the server copy 112b' is now associated with a read validation token of two while the write validation token stays at one. In response to detecting a change of the read validation token and that the local copy 112a has not been modified, the sync agent 108 can be configured to download the server copy 112b' from the file server 106 and overwrite the local copy 112a, as shown in FIG. 2D. Upon completion of overwriting the local copy 112a, both the local copy 112b and the server copy 112b' have the same stream of digital data with the same read and write validation tokens.

Figure 3A:
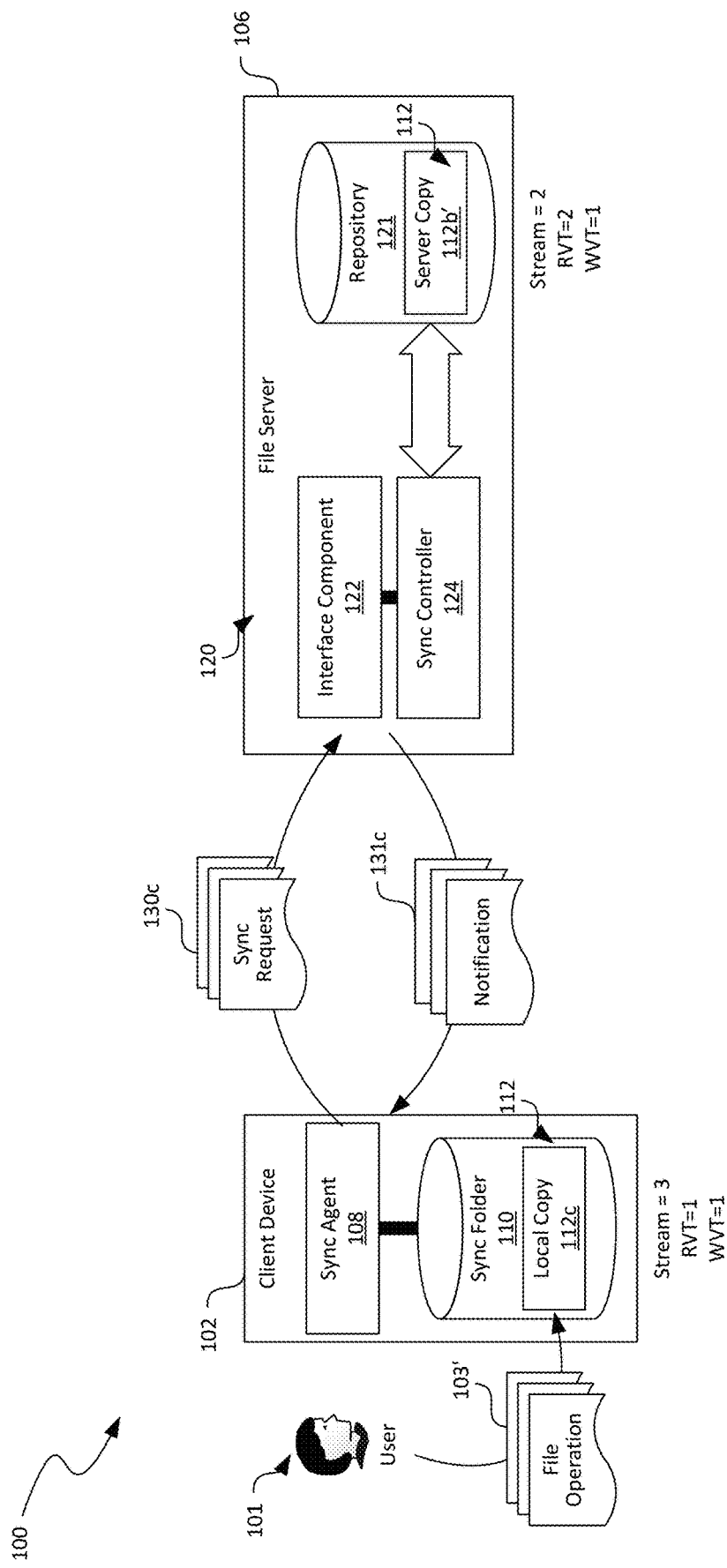
FIGS. 3A-3D are schematic diagrams illustrating certain hardware/software components of the computing system in FIG. 1 during certain stages of another file synchronization process.

The file synchronization operations shown in FIGS. 2C and 2D, however, can sometimes be interrupted when the user 101 edits the local copy 112a before the server copy 112b' can be downloaded from the file server 106. For example, as shown in FIG. 3A, the user 101 can perform another file operation 103' to the local copy 112a (FIG. 2C) to generate an updated local copy 112c. As such, the local copy 112c can now have a stream number three different than the original local copy 112a.

Figure 3B:
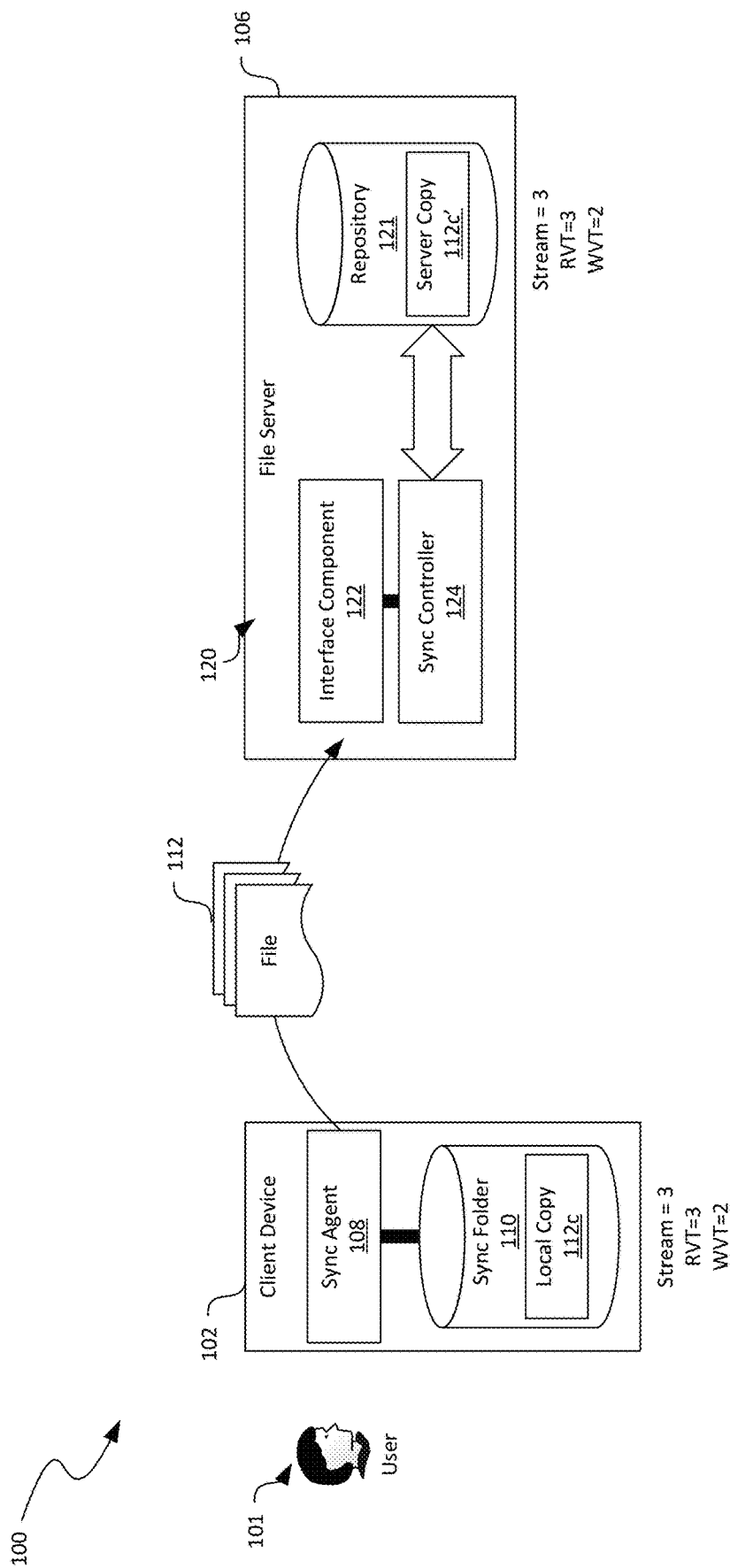

In certain embodiments, in response to detecting the updated local copy 112c, the sync agent 108 can transmit another sync request 130c to the file server 106 and receive in response, another notification 131c indicating that the server copy 112b' is currently associated with a read validation token of two and a write validation token of one. In response to receiving the notification 131c, the sync agent 108 can determine that even though the server copy 112b' contains changes only included in the local copy 112c, such changes are deemed as re-appliable and thus can be overwritten because the write validation token associated with the local copy 112c and that associated with the server copy 112b' match. As such, the sync agent 108 can upload the local copy 112c to the file server 106 to overwrite the server copy 112b' along with the machine modifications 128 (FIG. 2C) previously applied. In other embodiments, the sync agent 108 can simply upload the edited local copy 112c and the sync controller 124 can perform the foregoing operations to determine whether the server copy 112b' may be overwritten. As shown in FIG. 3B, the overwritten server copy 112c' now has a read validation token of three and a write validation token of 2, matching those of the local copy 112c, respectively.

Figure 3C:
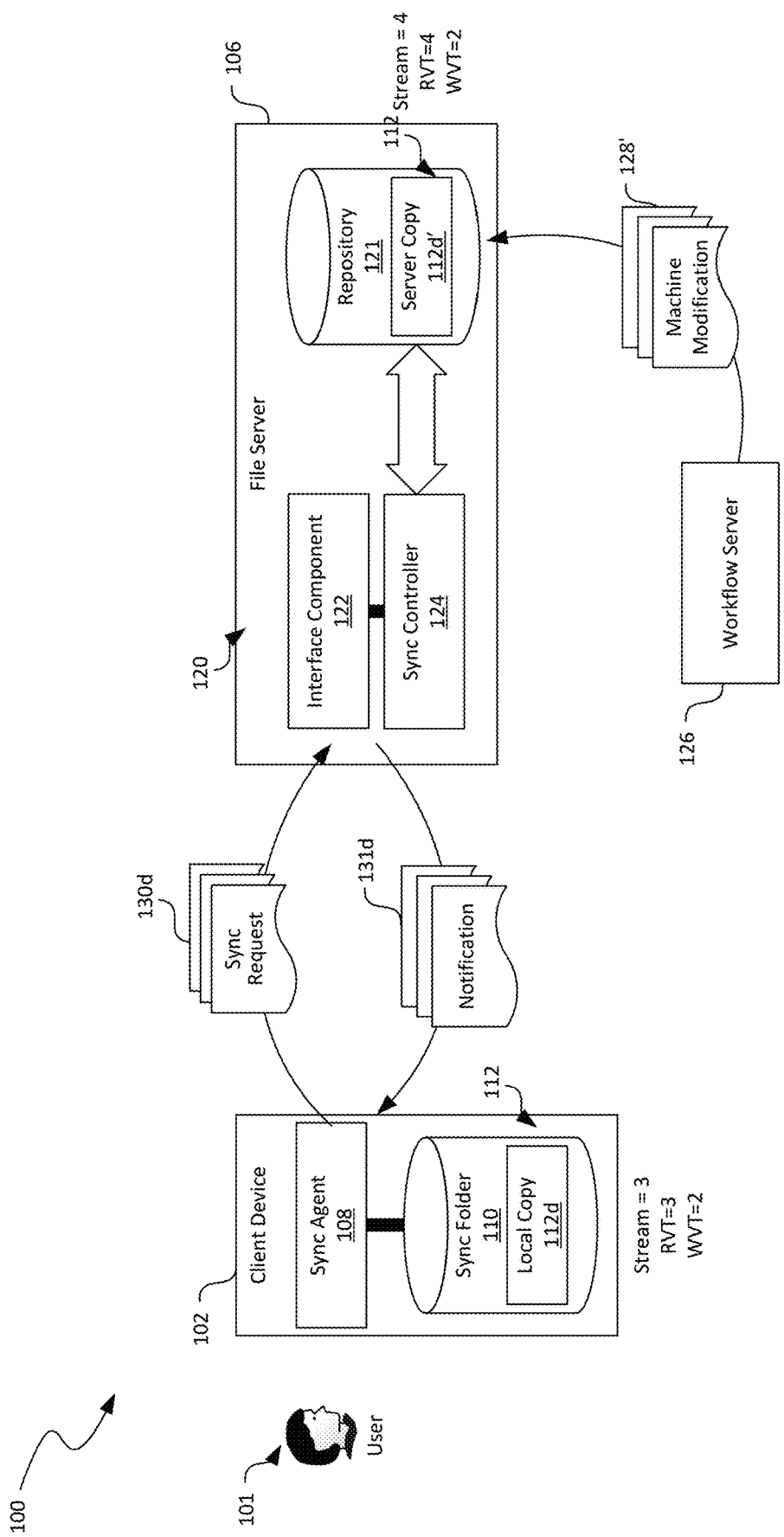
Figure 3D:
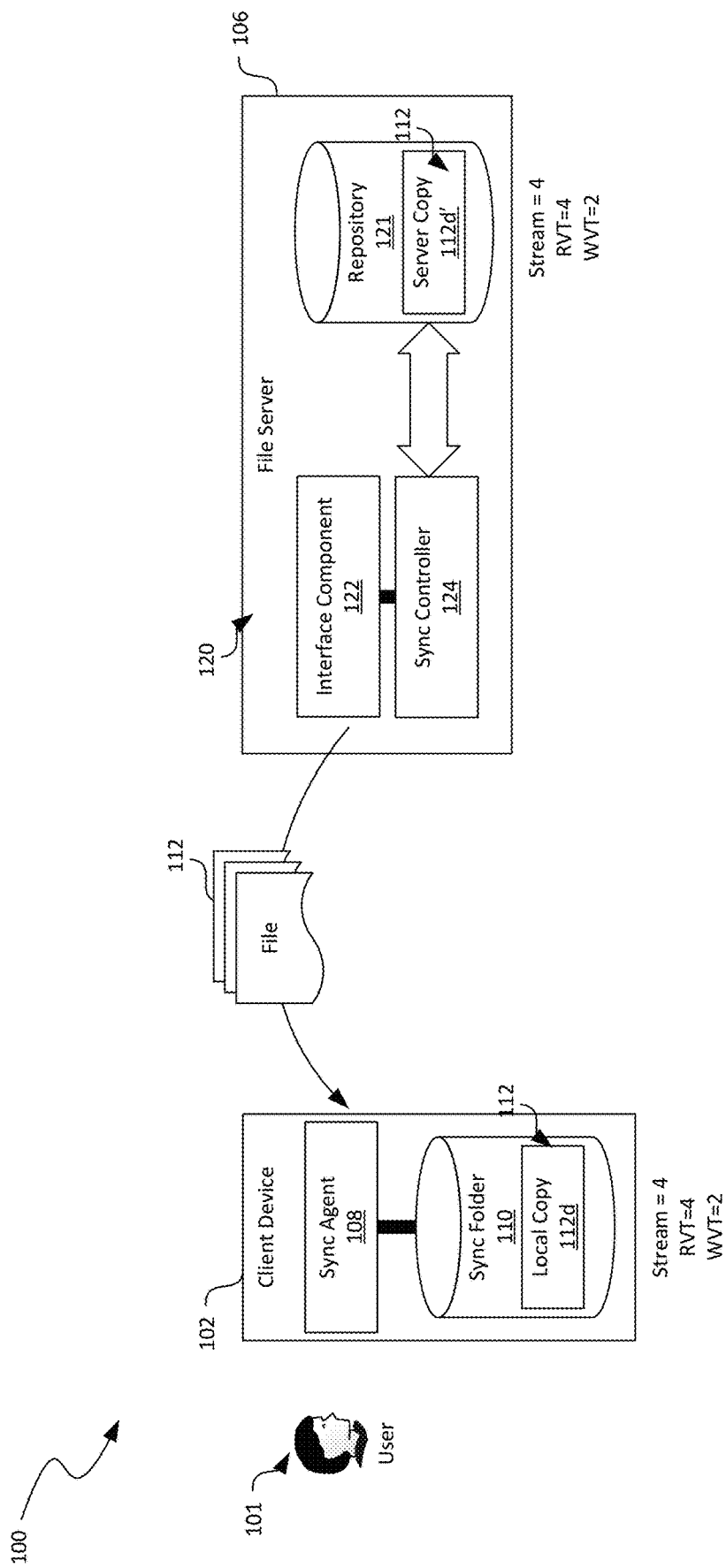

As shown in FIG. 3C, the workflow server 126 can then re-apply the machine modifications 128' to the server copy 112c' to generate another updated server copy 112d'. Because the machine modifications 128' are re-appliable, the sync controller 124 can update the associated read validation token to four while maintaining the write validation token at 2. Subsequently, the client device 102 can download the server copy 112d' from the file server 106 when the user 101 does not edit the local copy 112c. As shown in FIG. 3D, the local copy 112c (FIG. 3C) can then be overwritten with the server copy 112d' to achieve synchronization between the local copy 112d and the server copy 112d'.

Several embodiments of the disclosed technology can thus limit occurrences of synchronization conflicts caused by machine modifications by implementing both a read validation token and a write validation token associated with individual copies of computer files in addition to a read validation token. The read validation token can be updated when a server copy of a computer file is modified in any way to be byte-wise different than an original server copy. As such, when machine modifications are applied to a server copy, the modified server copy can have an updated read validation token. The write validation token, on the other hand, can be maintained when the server copy is modified but the machine modifications are indicated as re-appliable. Thus, instead of indicating a synchronization conflict exists between a user-edited local copy and a server copy with machine modifications, the disclosed technology allows the file server 106 to overwrite the server copy with the user-edited local copy. Thus, certain synchronization conflicts due to re-appliable machine modifications can be avoided.

Figure 4A:
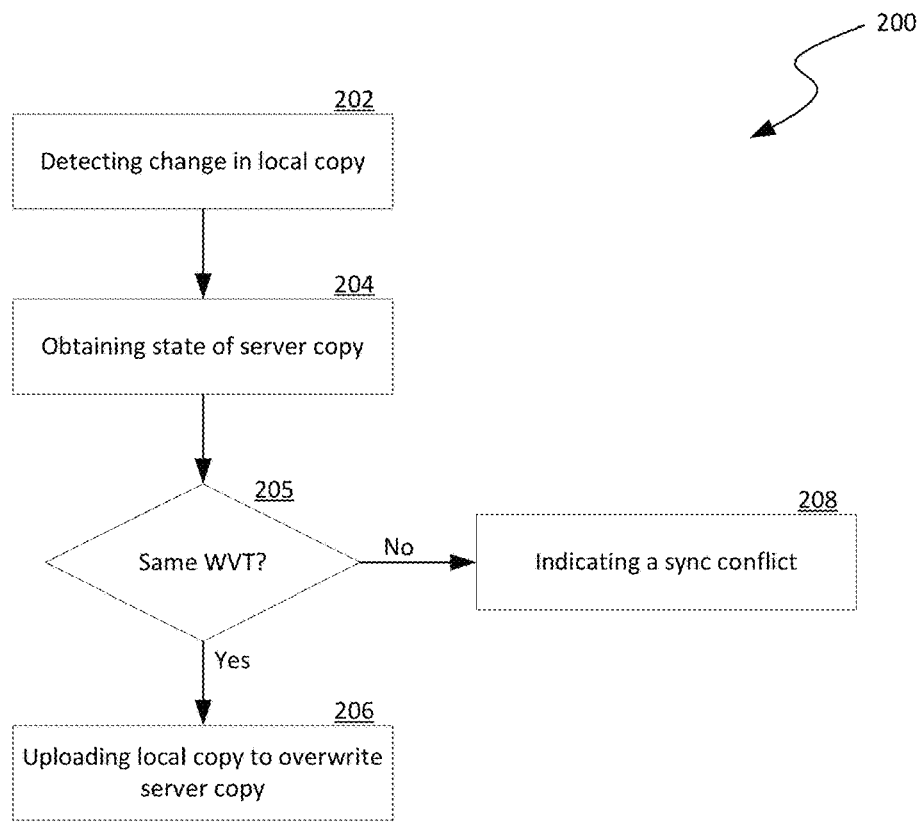
FIGS. 4A-4C are flowcharts illustrating various aspects of processes of file synchronization in accordance with embodiments of the disclosed technology.
Figure 4B:
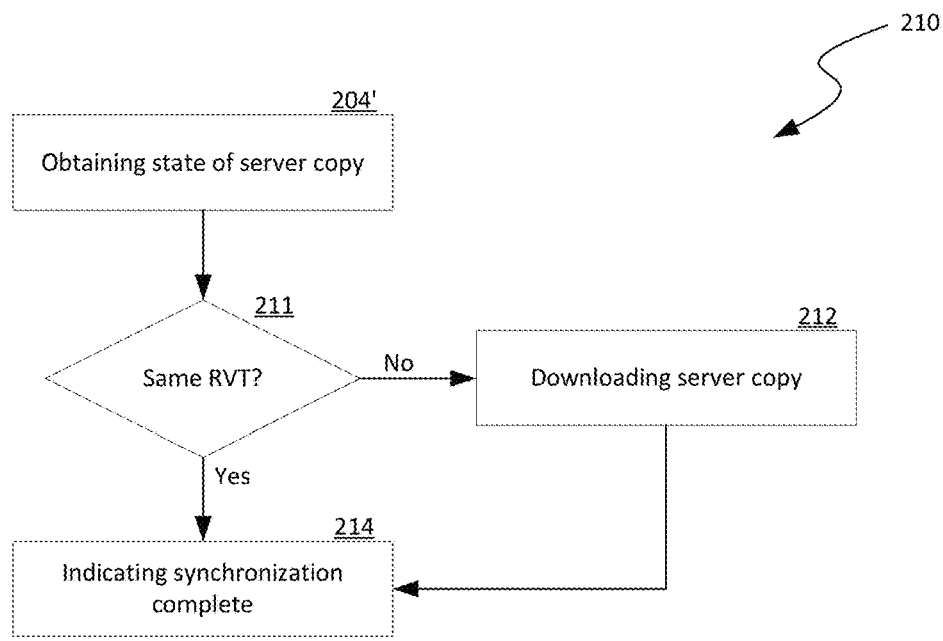
Figure 4C:
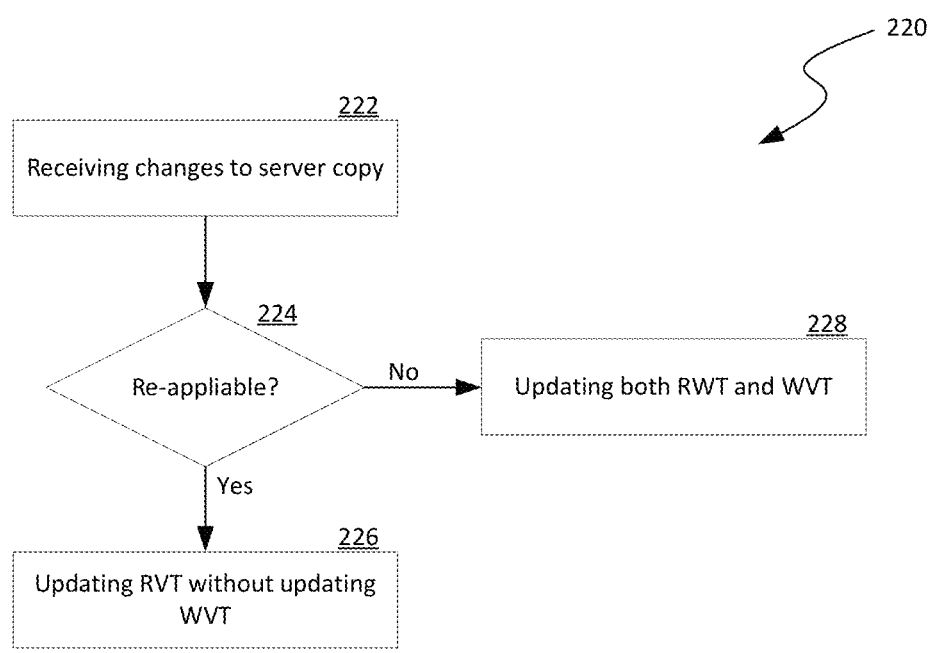

FIGS. 4A-4C are flowcharts illustrating processes of file synchronization in accordance with embodiments of the disclosed technology. Even though the processes are described below with reference to the computer system 100 of FIG. 1, in other embodiments, the processes can also be applied in other computer systems with similar or different components.

FIG. 4A is a flowchart illustrating a process 200 of file synchronization when a local copy is modified in accordance with embodiments of the disclosed technology. As shown in FIG. 4A, the process 200 can include detecting a change in a local copy of a computer file at stage 202. In one embodiment, the detected change can include a user edit to the computer file. In another embodiment, the detected change can include a user creating the computer file. In other embodiments, the detected change can include other suitable user operations that create and/or modify the computer file.

The process 200 can then include obtaining state information of a corresponding server copy of the computer file at stage 204. In certain embodiments, the state information includes an existence or non-existence of a server copy of the computer file in, for example, the repository 121 of FIG. 2A. In other embodiments, the state information can also include a current read validation token and a current write validation token of a server copy in the repository 121. In further embodiments, the state information can also include last modified by, last modification date/time, or other suitable information related to the server copy.

The process 200 can then include a decision stage 205 to determine whether the write validation token of the changed local copy matches that of the server copy. In response to determining that the write validation tokens match, the process 200 can include uploading the changed local copy to overwrite the server copy in the repository 121, irrespective of whether the read validation tokens match, at stage 206. In response to determining that the write validation tokens do not match, the process 200 can include indicating a synchronization conflict at stage 208. The process 200 can also further include requesting user intervention for resolving the synchronization conflict and/or perform other suitable operations to resolve the synchronization conflict.

FIG. 4B is a flowchart illustrating a process 210 of file synchronization when a local copy is not modified in accordance with embodiments of the disclosed technology. As shown in FIG. 4B, the process 210 can include obtaining state information of a corresponding server copy at stage 204', generally similar to stage 204 described above with reference to FIG. 4A. The process 210 can then include a decision stage 211 to determine whether a read validation token of the local copy matches that of the server copy. In response to determining that the read validation token of the local copy matches that of the server copy, the process 210 can include indicating that file synchronization of the computer file is complete at stage 214. In response to determining that the read validation token of the local copy does not match that of the server copy, the process 210 can include downloading the server copy to overwrite the local copy at stage 212 before indicating that file synchronization of the computer file is complete at stage 214.

FIG. 4C is a flowchart illustrating a process 220 of managing a server copy on a file server in accordance with embodiments of the disclosed technology. As shown in FIG. 4C, the process 220 can include receiving changes to a server copy at stage 222. The process 220 can then include a decision stage 224 to determine whether the received changes are re-appliable. In certain embodiments, the changes are re-appliable when the changes are machine modifications that can be repeatedly applied. In other embodiments, the changes can be re-appliable based on other suitable criteria. In response to determining that the changes are re-appliable, the process 220 can include updating a read validation token associated with the server copy without updating a write validation token associated with the same server copy. In response to determining that the changes are not re-appliable, the process 220 can include updating both the read validation token and the write validation token associated with the server copy.

FIG. 5 is a computing device 300 suitable for certain components of the computer system 100 in FIG. 1. For example, the computing device 300 can be suitable for the file server 106, the workflow server 126, or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of facilitating file synchronization between a client device and a file server via a computer network, the method comprising:

detecting a change to a local copy of a version of a computer file on the client device, the original local copy being associated with a local token;

obtaining, via the computer network, data regarding a server token associated with a server copy of the same computer file on the file server, the server copy containing another change to the same version of the computer file, wherein the another change is different than the detected change to the local copy;

determining whether the local token associated with the local copy matches the server token associated with the server copy;

in response to determining that the local and server tokens do not match each other, indicating a synchronization conflict is present between the local copy having the detected change and the server copy having the another change; and in response to determining that the local and server tokens match each other, uploading, via the computer network, the local copy having the detected change from the client device to the file server to overwrite the server copy even though the server copy contains the another change to the version of the computer file that is different than the detected change to the local copy of the same version of the computer file, thereby limiting occurrences of synchronization conflicts between the local copy and the server copy of the computer file.

2. The method of claim 1 wherein detecting the change to the local copy includes detecting a file operation performed by a user on the local copy of the version of the computer file.

3. The method of claim 1 wherein subsequent to uploading the local copy having the detected change, receiving, via the computer network, information indicating an updated value for the local token.

4. The method of claim 1 wherein:
the another change to the version of the computer file includes metadata inserted to the version of the computer file; and
uploading the local copy includes uploading the local copy having the detected change from the client device to the file server to overwrite the server copy along with the inserted metadata.

5. The method of claim 1 wherein:
the local token is a local write validation token and the server token is a local write validation token;
the local copy is also associated with a local read validation token and the server copy is also associated with a server read validation token that is different than the local read validation token; and
uploading the local copy includes uploading the local copy having the detected change from the client device to the file server to overwrite the server copy irrespective to whether the local read validation token matches the server read validation token.

6. The method of claim 1 wherein the local token and the server token individually includes a hash value of the local copy and the server copy, respectively.

7. The method of claim 1 wherein:
the local token is a local write validation token and the server token is a local write validation token;
the local copy is also associated with a local read validation token and the server copy is also associated with a server read validation token that is different than the local read validation token; and
subsequent to overwriting the server copy with the local copy having the detected change,
detecting that the local read validation token is different than the server read validation token; and
in response to detecting that the local read validation token is different than the server read validation token, downloading, via the computer network, the server copy to overwrite the local copy when a further change to the local copy is absent.

8. A computing device interconnected to a file server via a computer network, the computing device comprising:
a processor; and
a memory containing a local copy of a version of a computer file having a user update, the local copy being associated with a local token, wherein the memory also contains instructions executable by the processor to cause the processor to perform a process comprising:
receiving, via the computer network, data regarding a server token associated with a server copy of the same computer file on the file server, the server copy containing a change to the same version of the computer file that is different than the user update to the local copy;
when the local and server tokens do not match each other, indicate a synchronization conflict is present between the local copy having the user update and the server copy having the change; and
when the local and server tokens match each other, uploading, via the computer network, the local copy having the user update from the client device to the file server to overwrite the server copy even though the server copy contains the change that is different than the user update to the local copy of the same version of the computer file, thereby avoiding declaring a synchronization conflict between the local copy with the user update and the server copy with the change that is different than the user update.

9. The computing device of claim 8 wherein the user update to the local copy includes a file operation performed by a user on the local copy of the version of the computer file.

10. The computing device of claim 8 wherein subsequent to uploading the local copy having the user update, updating a value of the local token corresponding to the local copy having the user update.

11. The computing device of claim 8 wherein:
the change contained in the server copy includes metadata inserted to the version of the computer file according to a metadata schema associated with the file server; and
uploading the local copy includes uploading the local copy having the user update to the file server to overwrite the server copy along with the inserted metadata.

12. The computing device of claim 8 wherein:
the local token is a local write validation token and the server token is a local write validation token;
the local copy is also associated with a local read validation token and the server copy is also associated with a server read validation token that is different than the local read validation token; and
uploading the local copy includes uploading the local copy having the user update from the client device to the file server to overwrite the server copy irrespective to whether the local read validation token matches the server read validation token.

13. The computing device of claim 8 wherein:
the change contained in the server copy includes another user update to the version of the computer file from another user; and
the process performed by the processor further includes when the local and server tokens do not match each other, indicating a synchronization conflict is present between the local copy having the user update and the server copy having the another user update.

14. The computing device of claim 8 wherein the local token and the server token individually includes a hash value of the local copy and the server copy of the computer file, respectively.

15. The computing device of claim 8 wherein:
the local token is a local write validation token and the server token is a local write validation token;
the local copy is also associated with a local read validation token and the server copy is also associated with a server read validation token that is different than the local read validation token; and
when the local and server write validation tokens match each other and the local and server read validation tokens differ from each other, downloading, via the computer network, the server copy to overwrite the local copy.

16. A computing device interconnected with multiple client devices via a computer network, the computing device comprising:
a processor; and
a memory containing instructions executable by the processor to cause the processor to perform a process comprising:
detecting a change to a server copy of a computer file previously synchronized with a corresponding local copy of the computer file on a client device, wherein:
the local copy is associated with a local read validation token and a local write validation token; and
the server copy is associated with a server read validation token and a server write validation token match the local read validation token and the local write validation token, respectively;
determining whether the detected change is re-appliable to the server copy;
in response to determining that the detected change is not re-appliable to the server copy, updating both the server read validation token and the server write validation token such that both the server read validation token and the server write validation token are different than the local read validation token and the local write validation token, respectively; and
in response to determining that the detected change is re-appliable to the server copy,
updating the server read validation token while maintaining the write validation token despite the detected change such that the server read validation token differs from the local read validation token while the server write validation token matches the local write validation token of the local copy; and
notifying, via the computer network, the client device regarding the updated read validation token.

17. The computing device of claim 16 wherein detecting the change to the server copy includes detecting insertion of metadata insertion into the server copy of the computer file.

18. The computing device of claim 16 wherein:
detecting the change to the server copy includes detecting insertion of metadata insertion into the server copy of the computer file; and
determining whether the detected change is re-appliable to the server copy includes receiving an indication from an application inserting the metadata into the server copy whether the inserted metadata is re-appliable.

* * * * *